United States Patent [19]

Mitsui et al.

[11] 3,867,656
[45] Feb. 18, 1975

[54] BRUSHLESS DIRECT CURRENT MOTOR

[75] Inventors: Yoshihiro Mitsui; Hiroshi Kamakura, both of Matsumoto, Japan

[73] Assignees: Kabushiki Kaisha Siwa Seikosha, Ginza; Kabushiki Kaisha Siwa Seikosha, Chuo-ku, both of, Japan

[22] Filed: Dec. 13, 1972

[21] Appl. No.: 314,626

[30] Foreign Application Priority Data
Dec. 13, 1971 Japan............................ 46-100244
Dec. 13, 1971 Japan............................ 46-100245

[52] U.S. Cl.................. 310/68, 310/156, 310/268
[51] Int. Cl............................................. H02k 11/00
[58] Field of Search.......... 310/126, 156, 185, 187, 310/168, DIG. 3, 39, 268, 40, 46; 318/132, 138, 254, 439

[56] References Cited
UNITED STATES PATENTS

| | | | |
|---|---|---|---|
| 3,184,623 | 5/1965 | Marti et al. | 310/156 X |
| 3,430,119 | 2/1969 | Shelley | 318/132 X |
| 3,483,456 | 12/1969 | Brunner et al. | 318/254 X |
| 3,569,753 | 3/1971 | Babikyan | 310/268 x |
| 3,579,277 | 5/1971 | Imahashi | 310/156 |
| 3,599,050 | 8/1971 | Suwa-Shi | 318/138 |
| 3,665,271 | 5/1972 | Assmus et al. | 318/138 |
| 3,679,953 | 7/1972 | Bedford | 318/166 x |

*Primary Examiner*—J. D. Miller
*Assistant Examiner*—Patrick R. Salce
*Attorney, Agent, or Firm*—Blum, Moscovitz, Friedman & Kaplan

[57] ABSTRACT

A brushless direct current motor having a flat type stator is provided with a magnetic sensitive element disposed within the magnetic flux of the rotor for detecting the condition of said magnetic flux and driving coils having driving current passing therethrough in response to a detection signal produced by the magnetic sensitive element.

12 Claims, 13 Drawing Figures

3,867,656

BRUSHLESS DIRECT CURRENT MOTOR

BACKGROUND OF THE INVENTION

This invention relates to brushless direct current motors utilizing Hall elements for detecting the condition of the magnetic flux and for controlling the driving current applied to the driving coils thereof.

In conventional brushless direct current motors incorporating magnetic sensitive elements, the rotor is formed with a permanent magnet structure magnetized in the radial direction relative to the rotor, Hall elements being positioned in radially spaced relation relative to said rotor in the magnetic path. In such arrangements, a ring structure is mounted circumferentially about the rotor for retaining the Hall elements and for providing a path for the magnetic flux. This structure has proved difficult to manufacture, being both complex, large and expensive. Further, motors incorporating such structure are characterized by relatively slow current response and inferior torque characteristics.

SUMMARY OF THE INVENTION

Generally speaking, in accordance with the invention, a brushless direct current motor is provided including a rotor formed with a magnetic circuit having an air gap through which magnetic flux flows in a direction parallel with the rotary axis of said rotor and a flat type stator. Said stator is provided with a magnetic sensitive element disposed within the path of the magnetic flux within said air gap in said rotor for detecting the condition of said magnetic flux, and driving coils also disposed within said gap, said magnetic sensitive elements being operatively coupled to said driving coils for controlling the driving current applied to said coils in response to the signal produced by said magnetic sensitive element. Said driving coils are as to occupy a quadrant of an angle of about $2\pi \div$ by the number of the magnetic poles of the rotor. In particular, the angle between the axes of the respective driving coils controlled by a single magnetic sensitive element is about an integral multiple of $2\pi \div$ by the number of magnetic poles of said rotor. The angle between said magnetic sensitive element and the driving coils controlled thereby being about an integral multiple of the sum of $2\pi \div$ by the number of the magnetic poles of the rotor and $\pi \div$ by the number of magnetic poles of the rotor.

Accordingly, it is an object of the invention to provide a motor which detects the direction of the magnetic field in the rotor and the width of said field and alternately applies electric power to driving coils occupying a quadrant corresponding to the width of said magnetic field.

Another object of the invention is to provide a brushless direct current motor having a rotor in which magnetic flux flows in the direction parallel to the rotary axis thereof and having Hall elements and driving coils positioned within said magnetic flux for the increase in the efficiency thereof.

A further object of the invention is to provide a brushless direct current motor having superior torque characteristics due to the rapid response of the Hall elements, causing rapid application of driving current to the driving coils thereof.

Still a further object of the invention is to provide a brushless direct current motor having little iron loss and being characterized by a rise in efficiency through selection of the number of magnetic poles of the rotor, the form and the angle of the quadrant occupied by the driving coils.

Still another object of the invention is to provide a brushless direct current motor wherein efficiency is increased by selection of the angle between driving coils, the angle between a Hall element and the driving coils controlled thereby, and the angle between Hall elements.

A further object of the invention is to provide a brushess direct current motor having an essentially flat stator carrying Hall elements and driving coils, and wherein the stator is positioned extremely close to the rotor but without touching same.

Still another object of the invention is to provide a brushless direct current motor wherein assembly is simplified.

Still other objects and advantages of the invention will in part be obvious and will in part be apparant from the specification and drawings.

The invention accordingly comprises the features of construction, combinations of elements, and arrangements of parts which will be exemplified in the constructions hereinafter set forth, and the scope of the invention will be indicated in the claims.

DESCRIPTION OF THE PREFERRED EMBODIMENTS

Figure 1:
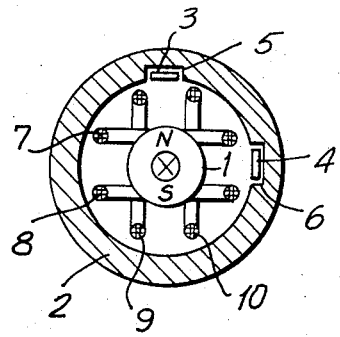
FIG. 1 is a cross sectional view of a conventional motor structure.

Referring now to FIG. 1, the prior art motor depicted includes a rotor 1 magnetized in the radial direction. Hall elements 3 and 4 are supported by a ring structure 2 which extends concentrically with rotor 1 in said radially extending magnetic field. Hall elements 3 and 4 are provided for detecting the condition of the magnetic flux and are mounted as closely as possible to rotor 1. Ring structure 2 further serves as part of the magnetic circuit for retaining the flux. Hall elements 3 and 4 are respectively mounted in notches 5 and 6 formed on the inner periphery of ring structure 2. Four driving coils, 7, 8, 9 and 10 are disposed in the path of the magnetic flux between rotor 1 and ring structure 2.

Figure 2:
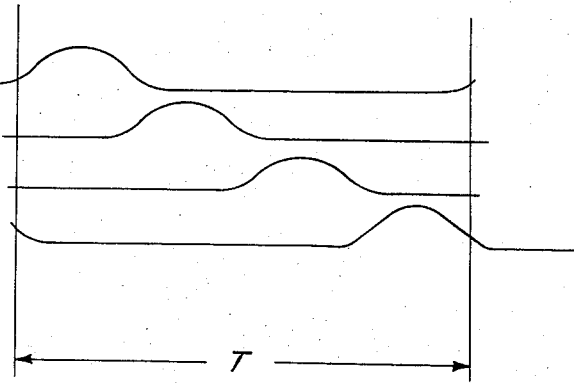
FIG. 2 is a waveform diagram of the Hall voltage in a conventional motor.

FIG. 2 shows the waveform of the Hall voltage $V_H$ during one period T of the rotor.

Hall elements 3 and 4 are spaced circumferentially about the rotor at an angle of $\pi/2$, so that each magnetic pole of rotor 1 is displaced relative to each Hall element. The gradual increase and decrease of the relative distance between each pole and the respective Hall element serves to produce a Hall voltage in each of said elements. The gradual nature of this change in distance causes relatively slow current response in the driving coils and inferior torque characteristics. Further, the ring structure is difficult to manufacture, being complex, relatively large and expensive.

The motor of FIG. 1 is relatively long in the axial direction because the driving coils are disposed in planes extending parallel to the axis of rotation of the rotor. This dimensional limitation is a necessary result of the orientation of the poles on the rotor and makes it difficult to provide a relatively flat motor construction. Further, a base plate having circuit elements interconnecting the Hall elements and the driving coils must be separately mounted on the motor and coupled thereto by electric cables. The motor would consist of the rotor, the ring structure, Hall elements, driving coils, an axis, a case, a bearing, etc. Thus, the user must not only mount the body of the motor, but must also mount the base plate.

Figure 3:
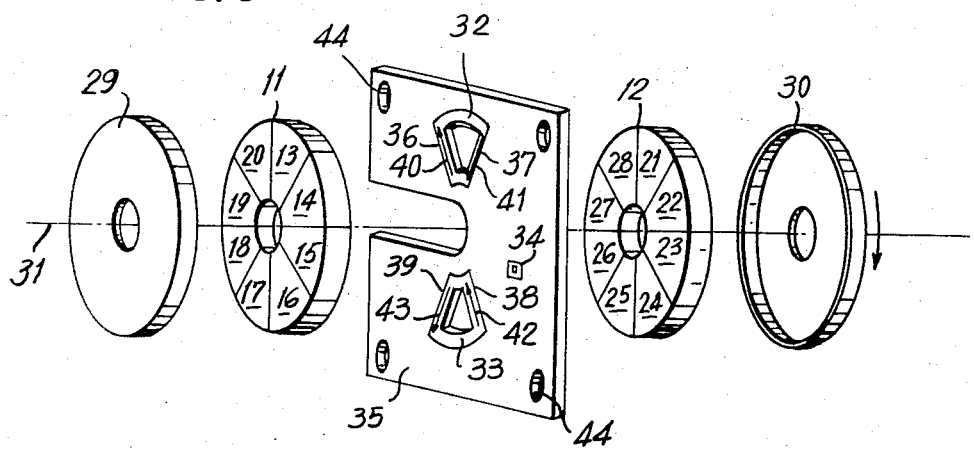
FIG. 3 is an exploded perspective view of one embodiment of the brushless direct current motor in accordance with the invention.
Figure 4:
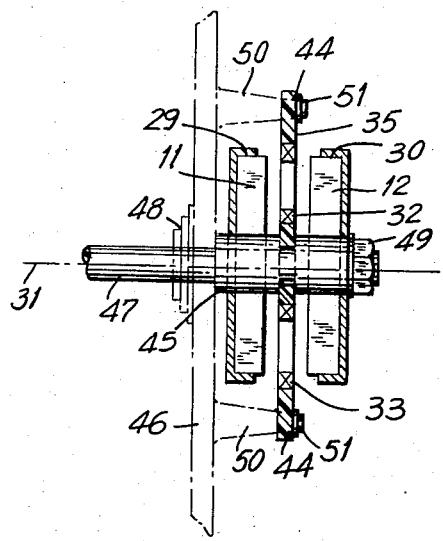
FIG. 4 is an assembled sectional view of the motor of FIG. 3.

Referring now to FIGS. 3 and 4, one embodiment of the arrangement in accordance with the invention is depicted.

The rotor of the motor of FIG. 3 carries a first set of permanent magnets 11, consisting of eight pie-shaped permanent magnets 13, 14, 15, 16, 17, 18, 19 and 20 mounted on yoke 29 and a second corresponding set of permanent magnets 12 consisting of permanent magnets 21, 22, 23, 24, 25, 26, 27 and 28 mounted on yoke 30. As shown in FIG. 4, said yokes are positioned in spaced relation on a bushing 45 in turn mounting on rotor shaft 47 which is aligned along the axis of rotation 31. Permanent magnets 11 and 12 are defined with poles on the faces thereof extending normally to axis 31. Each adjacent pair of permanent magnets in each group of permanent magnets is of opposite polarity while the facing poles of permanent magnets in groups 11 and 12 are likewise of opposite polarity. Thus, permanent magnets 13 and 21 which are in facing relation would have facing poles of opposite polarity. In this manner, a magnetic flux flows in the gap between permanent magnet groups 11 and 12 in a direction parallel to axis of rotation 31, the direction of flow of said flux changing every $\pi/4$ sector.

Flat driving coils 32 and 33 are burried in a flat base plate 35 and are shaped so as to occupy a $\pi/4$ sector. Said driving coils are mounted on plate 35 so that the axes thereof are spaced by an angle of $\pi$, the current flowing through said coils being controlled by Hall element 34. Said Hall element is spaced from driving coil 32 by an angle of $\frac{5}{8}\pi$. Both the driving coils 32 and 33 and Hall element 34 are mounted within the gap between groups of permanent magnets 11 and 12, and in particular, within the uniform magnetic field generated thereby, and defines the stator of the motor.

The gap between groups of permanent magnets 11 and 12 can be reduced to a minimum without touching the stator due to the flat construction of said stator. The motor is extremely efficient since the driving coils and Hall elements are subjected to a uniform magnetic field from closely spaced permanent magnets.

As shown in FIG. 4, a portion of the motor is mounted on a plate 46, bushing 45 being retained on shaft 47 by a nut 49. Plate 35 defining the stator is formed with a slot permitting insertion and removal relative to bushing 45 and is retained in position by screws 51 which engage projections 50 extending from plate 46.

Figure 5:
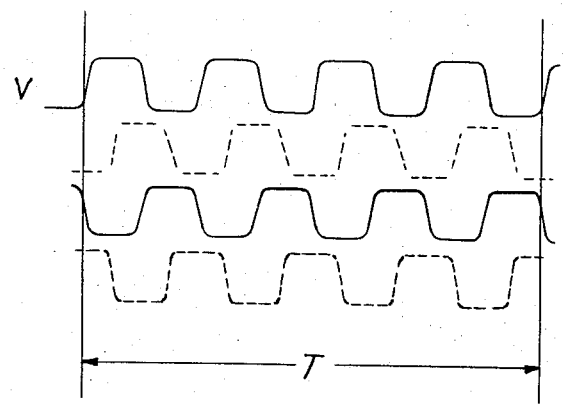
FIG. 5 is a waveform diagram showing the Hall voltage of the motor in accordance with the invention.
Figure 6:
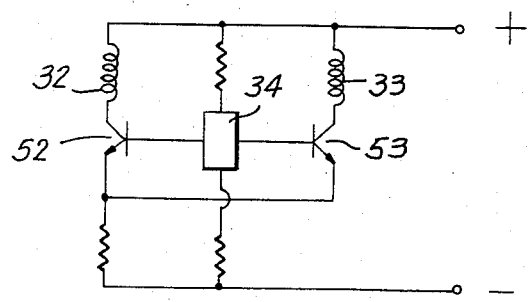
FIG. 6 is a circuit diagram showing the driving circuit for the driving coils including said Hall element.

The waveform of the Hall voltage V produced in one period T of the motor is shown in solid lines in FIG. 5. The circuit interconnecting the Hall element 34 and driving coils 32 and 33 is depicted in FIG. 6. The Hall element detects the direction of the magnetic field produced by the rotor and the width of each sector of said magnetic field. Thus, by way of example, when the stator and rotor are positioned as depicted in FIG. 3, the magnetic field produced by permanent magnets 15 and 23 is applied to the Hall element 34. A Hall voltage produced in Hall element 34 is applied to the base of transistor 52 to cause driving current to be applied to driving coil 32. This current flows through the edges 36 and 37 of driving coil 32 in the direction indicated by arrows 40 and 41 to cause the rotor to start rotation in the predetermined rotary direction due to the interaction between the current flowing through edge 36 and permanent magnets 20 and 28 of the rotor and the interaction between the current flowing through edge 37 and permanent magnets 13 and 21 of the rotor in accordance with normal electromagnetism principles. When the rotor has rotated by about $\pi/8$, the magnetic field of permanent magnets 14 and 22 is applied to Hall element 34.

At this position, power is applied to driving coil 33 by the application of a positive Hall voltage to the base of transistor 53 to apply a current to driving coil 33. Said current flows through the edges 38 and 39 of driving coil 33 in a predetermined direction indicated by arrows 42 and 43. The rotation of the rotor is thus maintained by the interaction between the current flowing through edge 38 and permanent magnets 15 and 23 and the interaction between the current flowing through edge 39 and permanent magnets 16 and 24. When the rotor rotates by an angle of about $\pi/4$, the input signal of driving transistor 52 is rendered positive while that of driving transistor 53 is rendered negative, thereby cutting off the current to coil 33 and applying current to coil 32. The rotation of the rotor is maintained by the repetition of this action.

Since Hall element 34 is disposed in a position to receive a uniform magnetic field over a broader quadrant from closely spaced permanent magnets, the Hall voltage is much greater than that produced in conventional motors. Further, due to the uniform nature of the field, the response of the Hall voltage, and therefore of the driving current to the change in direction of the field every $\pi/4$ sector is extremely fast, thereby improving the torque characteristics of the motor. Similarly, since the driving coils are positioned in said uniform magnetic field, the permanent magnet is extremely efficient.

In order to maximize the efficiency of the device, each driving coil is formed so as to occupy a quadrant defining an angle of about $\pi/4$, or $2\pi \div$ by the number of magnetic poles of the rotor. Further, the angle between the axes of the driving coils controlled by a single Hall element should be the angle defined by an integral multiple of $2\pi \div$ by the number of the magnetic poles of the rotor. This permits wide freedom in positioning the driving coils. In the embodiment depicted in FIG. 3, the driving coils are spaced by an angle equal to $\pi$, calculated as follows:

$$\pi = (2\pi \div 8) \times 4$$

This angle was selected so as to symmetrically position the driving coils for ease of assembly.

The angular positioning between Hall element 34 and driving coil 32 is an angle calculated by adding an integral multiple of $2\pi \div$ by the number of magnetic poles of the rotor and $\pi \div$ by the number of magnetic poles of the rotor. While this formula permits wide lattitude in the positioning of the Hall element relative to the driving coils, in the embodiment depicted in FIG. 3, the angle is fixed at $5/8\pi$, calculated as follows:

$$(\pi \div 8) + [(2\pi \div 8) \times 2] = 5/8\pi.$$

Figure 7:
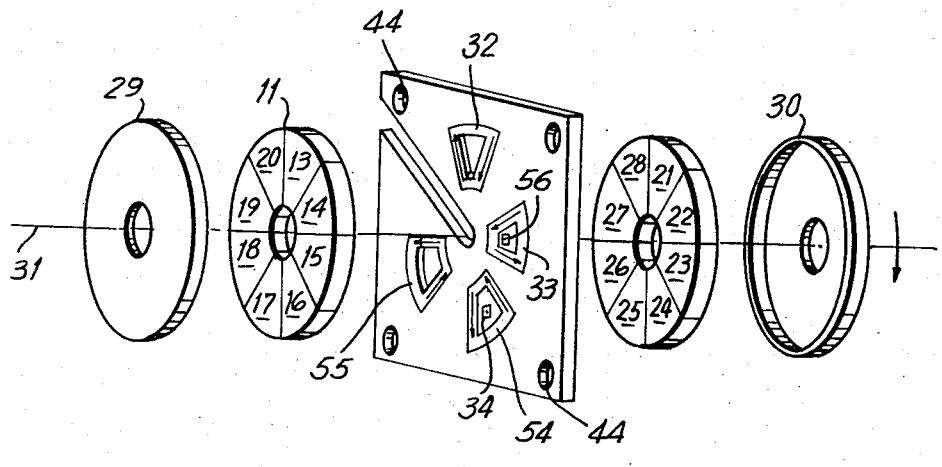
FIGS. 7 and 8 are exploded views of two further embodiments of the brushless direct current motor in accordance with the invention.

FIG. 7 depicts the structure of another embodiment of the motor in accordance with the invention wherein like reference numerals are applied to like elements. In this embodiment, the stator is provided with four driving coils, 32, 33, 54 and 55 and two Hall elements 34 and 56. Driving coils 32 and 33 are controlled by Hall element 34 while driving coils 54 and 55 are controlled by Hall element 56.

The angle of the quadrant occupied by each driving coil, the angle defined between the axes of the respective driving coils, and the angle between each Hall element and its respective driving coils are obtained by the foregoing expressions. The angle defined between Hall elements 34 and 56 is calculated by adding an integral multiple of $2\pi \div$ by the number of magnetic poles of the rotor to $\pi \div$ by the number of magnetic poles of the rotor. In the embodiment of FIG. 7, the angle is calculated as follows:

$$(\pi \div 8) + [(2\pi \div 8) \times 1] = 3/8\pi.$$

By this positioning, the Hall voltage and characteristics of operation of Hall element 56 are essentially the same as those of Hall element 34, but shifted in phase as shown by the dotted lines in FIG. 5. The principles of operation of the motor are identical to the motor of FIG. 3.

Figure 8:
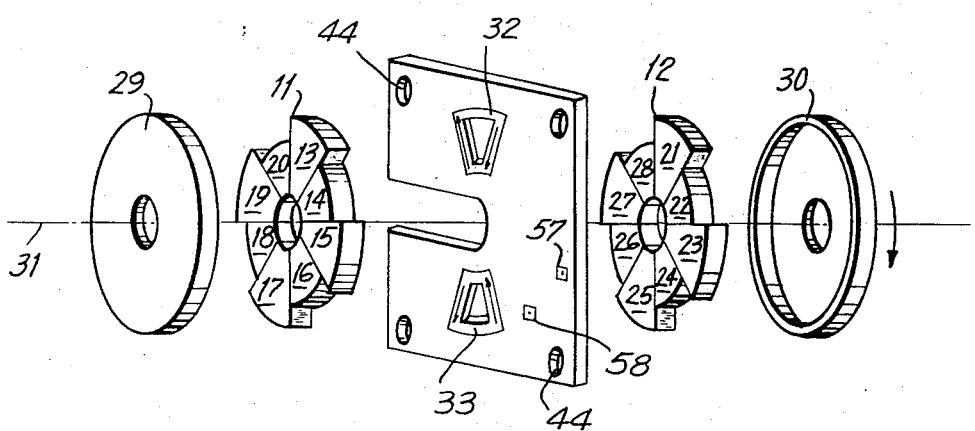
Figure 9:
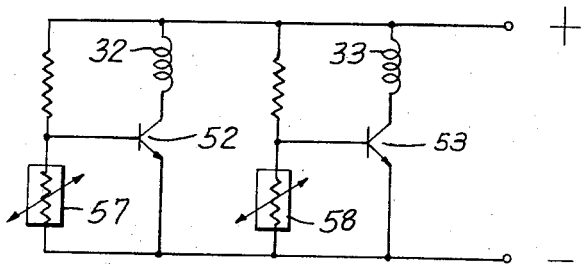
FIG. 9 is a circuit diagram of a further embodiment of the driving circuit of the arrangement in accordance with the invention incorporating magnetic reluctance elements.

A further embodiment of the motor in accordance with the invention is depicted in FIG. 8. In said embodiment, like reference numerals have been applied to like elements. The rotor construction of the embodiment of FIG. 8 differs from the rotor construction of the embodiment of FIG. 3 in that alternate permanent magnets are of different radial length. Thus, permanent magnets 13, 15, 17 and 19 project radially beyond permanent magnets 14, 16, 18 and 20 of group of permanent magnets 11. Likewise, corresponding permanent magnets 21, 23, 25 and 27 project radially beyond permanent magnets 22, 24, 26 and 28 of group of permanent magnets 12. The permanent magnets projecting radially a greater distance of said two groups of permanent magnets are in aligned facing relation. The stator structure of the motor of FIG. 8 is substantially the same except that, in place of a Hall element, two magnetic reluctance elements 57 and 58 are substituted therefor. Said magnetic reluctance elements are angularly spaced by an angle equal to $\pi/4$, and are positioned so as to lie within the locus of the permanent magnets having the greater radial length but outside of the locus of the permanent magnets having the shorter radial length. The magnetic field of the permanent magnets of greater radial length changes the resistivity of magnetic reluctance elements 57 and 58 when in registration therewith. The driving circuit incorporating magnetic reluctance elements 57 and 58 is depicted in FIG. 9, wherein magnetic reluctance element 57 is connected in the base circuit of transistor 52 to control the application of driving current to driving coil 32, while magnetic reluctance element 58 is connected in the base circuit of transistor 53 to control the application of driving current to coil 33. The motor of FIG. 8 having two magnetic reluctance elements of no polarity functions along the same principles as the embodiments having a single Hall element.

While the embodiments of the motor in accordance with the invention discussed above each have eight permanent magnets defining each group of permanent magnets, the arrangement in accordance with the invention is not limited to this construction. Thus, in the embodiment of FIGS. 10 and 11, each group of permanent magnets 77 and 88 is formed with six permanent magnets of alternating polarity respectively mounted on yokes 79 and 80. As in the case of the earlier embodiments, said yokes are mounted on a bushing 81 in turn retained on a shaft 82 by a nut 90, said shaft being rotatable about axis 83. The direction of the magnetic field in the gap between said groups of permanent magnets changes every $\pi/3$ sector.

Flat coils 84 and 85 are mounted on plate 86, the edges of each of said coils occupying a $\pi/3$ sector, the axes of the respective coils being separated by an angle equal to $\pi$. A Hall element 87 is also mounted on plate 86, said plate being secured on a fixed plate 89 by means of screws 93 engaging projections 92 of plate 89. Plate 86 is formed with apertures 94 through which screws 93 extend. Plate 86 would also support the circuit elements of the driving circuit interconnecting Hall element 87 and driving coils 84 and 85.

Figure 12:
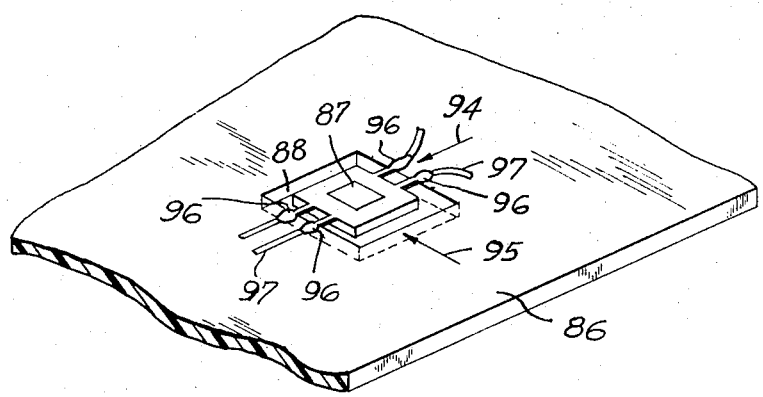
FIGS. 12 and 13 depict two methods of mounting the Hall elements in accordance with the invention.
Figure 13:
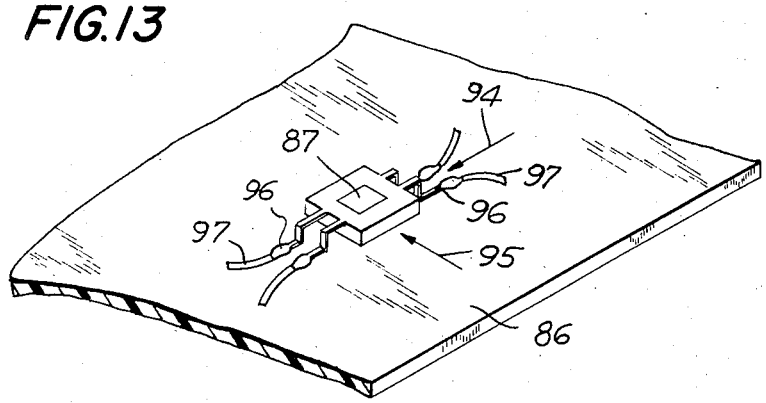

Two methods of mounting the Hall element is illustrated in FIGS. 12 and 13. In FIG. 12, Hall element 87 is mounted within an aperture 88 in plate 86 while in the embodiment of FIG. 13, said Hall element is mounted on the surface of said plate at a predetermined position. The predetermined position on plate 86 lies within the magnetic field of the rotor and, in this embodiment, is spaced by $\pi/2$ from the axes of the respective driving coils.

Figure 10:
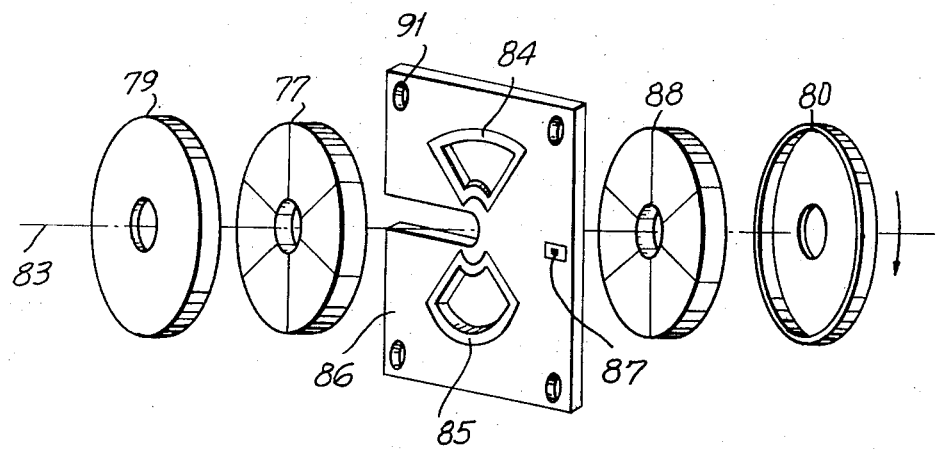
FIG. 10 is an exploded view of a further embodiment of the brushless direct current motor in accordance with the invention.
Figure 11:
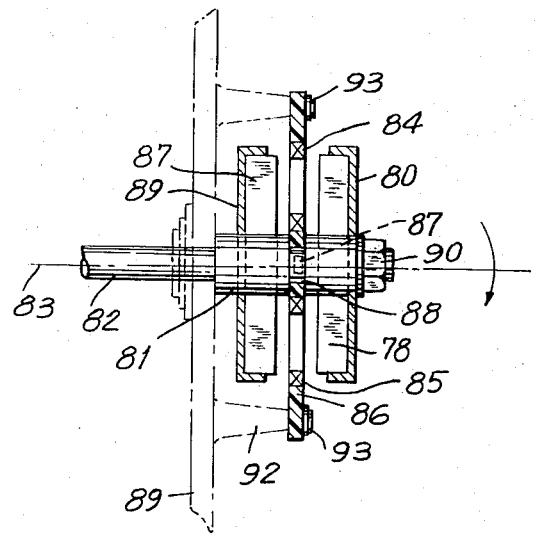
FIG. 11 is a sectional view of the assembled brushless direct current motor of FIG. 10.

The motor of FIGS. 10 and 11 function in the same manner as the motors previously described. Where Hall element 87 is inserted in aperture 88 of plate 86, the plate serves to provide mechanical protection for the Hall element, while the width of the stator is minimized. In FIGS. 12 and 13, the mutual position of the Hall element and the magnetic field of the rotor is indicated by arrow 94 while the mutual position of said element and the driving coils is indicated by an arrow 95. The terminals 96 of the Hall element can be soldered to a copper leaf 97, and adhesive can be applied around the Hall element to secure same in position.

In place of the aperture in FIG. 12, the plate may be formed with a recess, provided the shape and nature of the material of the plate is not such as to shield the magnetic field of the rotor.

It will thus be seen that the objects set forth above, and those made apparent from the preceding description, are efficiencly attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A brushless direct current motor comprising a rotor rotatable about a rotary axis and carrying magnetic circuit means defining a gap through which a magnetic field flows in a direction substantially parallel to said rotary axis; a flat stator plate positioned within said gap and having driving coil means and magnetic sensitive element means mounted thereon in said gap to thereby be within said magnetic field, said magnetic sensitive element means including at least one Hall element and is adapted to detect the condition of said magnetic field when said rotor is still and moving to produce a detecting signal in response thereto; and circuit means interconnecting said driving means and magnetic sensitive element means for applying a driving current to said driving coil means in response to said detecting signal.

2. A brushless direct current motor as recited in claim 1, wherein said magnetic sensitive element means is mounted within an aperture in said stator.

3. A brushless direct current motor as recited in claim 1, wherein said magnetic sensitive element means is mounted within a recess in the surface of said flat stator.

4. A brushless direct current motor comprising a rotor rotatable about a rotary axis and carrying magnetic circuit means defining a gap through which a magnetic field flows in a direction substantially parallel to said rotary axis; a flat stator plate positioned within said gap and having driving coil means and magnetic sensitive element means including at least one magneto resistive element mounted thereon in said gap to thereby be within said magnetic field, said magneto resistive element being adapted to detect the condition of said magnetic field when said rotor is still and moving to produce a detecting signal in response thereto; and circuit means interconnecting said driving means and magneto resistive element means for applying a driving current to said driving coil means in response to said detecting signal.

5. A brushless dirrct current motor as recited in claim 4, wherein said magneto resistive element is mounted within an aperture in said stator.

6. A brushless direct current motor as recited in claim 4, wherein said magneto resistive element is mounted within a recess in a surface of said flat stator.

7. A brushless direct current motor comprising a rotor rotatable about a rotary axis and carrying magnetic circuit means, said magnetic circuit means of said rotor including first and second groups of essentially pie-shaped permanent magnets mounted in spaced relation to define a gap, through which a magnetic field flows in a direction substantially parallel to said rotary axis, the permanent magnets of each group being distributed circumferentially about said rotary axis and being polarized along an axis extending substantially parallel to said rotary axis, each adjacent pair of permanent magnets in each group being of opposite polarity, the poles of the permanent magnets of said first group being of opposite polarity to the facing poles of the permanent magnets of said second group; a flat stator plate positioned within said gap and having driving coil means and magnetic sensitive element means mounted thereon in said gap to thereby be within said magnetic field, said driving coil means including at least two flat coils having a pair of opposed edges essentially extending radially relative to said rotary axis and defining a sector therebetween, the angle of the sector defined between said opposed edges of each of said driving coils is equal to about $2\pi \div$ by the number of permanent magnets in each of said groups of permanent magnets, said magnetic sensitive element being adapted to detect the condition of said magnetic field when said rotor is still and moving to produce a detecting signal in response thereto; and circuit means interconnecting said driving means and magnetic sensitive element means for applying a driving current to said driving coil means in response to said detecting signal.

8. A brushless direct current motor comprising a rotor rotatable about a rotary axis and carrying magnetic circuit means said magnetic circuit means of said rotor including first and second groups of essentially pie-shaped permanent magnets mounted in spaced relation to define a gap, through which a magnetic field flows in a direction substantially parallel to said rotary axis, the permanent magnets of each group being distributed circumferentially about said rotary axis and being polarized along an axis extending substantially parallel to said rotary axis, each adjacent pair of permanent magnets in each group being of opposite polarity, the poles of the permanent magnets of said first group being of opposite polarity to the facing poles of the permanent magnets of said second group; a flat stator plate positioned with said gap and having driving coil means and magnetic sensitive element means mounted thereon in said gap to thereby be within said magnetic field, said driving coil means including at least two flat coils having a pair of opposed edges essentially extending radially relative to said rotary axis and defining a sector therebetween, said magnetic sensitive element being adapted to detect the condition of said magnetic field when said rotor is still and moving to produce a detecting signal in response thereto; and circuit means interconnecting said driving means and magnetic sensitive element means for applying a driving current to said driving coil means in response to said detecting signal, the driving coils controlled by one of said magnetic sensitive element means are spaced by an angle equal to about an integral multiple of $2\pi \div$ by the number of permanent magnets in each of said groups.

9. A brushless direct current motor comprising a rotor rotatable about a rotary axis and carrying magnetic circuit means said magnetic circuit means of said rotor including first and second groups of essentially pie-shaped permanent magnets mounted in spaced relation to define a gap, through which a magnetic field flows in a direction substantially parallel to said rotary axis, the permanent magnets of each group being distributed circumferentially about said rotary axis and being polarized along an axis extending substantially parallel to said rotary axis, each adjacent pair of permanent magnets in each group being of opposite polarity, the poles of the permanent magnets of said first group being of opposite polarity to the facing poles of the permanent magnets of said second group; a flat stator plate positioned within said gap and having driving coil means and magnetic sensitive element means mounted thereon in said gap to thereby be within said magnetic field, said driving coil means including at least two flat coils having a pair of opposed edges essentially extending radially relative to said rotary axis and defining a sector therebetween, said magnetic sensitive element being adapted to detect the condition of said magnetic field when said rotor is still and moving to produce a detecting signal in response thereto; and circuit means interconnecting said driving means and magnetic sensitive element means for applying a driving current to said driving coil means in response to said detecting signal, the magnetic sensitive element means and the driving coil controlled thereby are spaced about said rotary axis such that the angle between the axis of each of said coils and said magnetic sensitive element means is equal to about the sum of an integral multiple of $2\pi \div$ by the number of permanent magnets in each group and $\pi \div$ by the number of permanent magnets in each group.

10. A brushless direct current motor comprising a rotor rotatable about a rotary axis and carrying magnetic circuit means said magnetic circuit means of said rotor including first and second groups of essentially pie-shaped permanent magnets mounted in spaced relation to define a gap, through which a magnetic field flows in a direction substantially parallel to said rotary axis, the permanent magnets of each group being distributed circumferentially about rotary axis and being polarized along an axis extending substantially parallel to said rotary axis, each adjacent pair of permanent magnets in each group being of opposite polarity, the poles of the permanent magnets of said first group being of opposite polarity to the facing poles of the permanent magnets of said second group; a flat stator pole positioned within said gap and having driving coil means and magnetic sensitive element means mounted thereon in said gap to thereby be within said magnetic field, said magnetic sensitive element being adapted to detect the condition of said magnetic field when said rotor is still and moving to produce a detecting signal in response thereto; and circuit means interconnecting said driving means and magnetic sensitive element means for applying a driving current to said driving coil means in response to said detecting signal, said motor having at least two magnetic sensitive element means and at least two driving coils controlled by each of said magnetic sensitive element means, said magnetic sensitive element means being positioned about said rotary axis so that the angle defined therebetween is equal to the sum of an integral multiple of $2\pi \div$ by the number of permanent magnets in each group and $\pi \div$ by the number of permanent magnets in each group.

11. A brushless direct current motor comprising a rotor rotatable about a rotary axis and carrying magnetic circuit means said magnetic circuit means of said rotor includes first and second groups of essentially pie-shaped permanent magnets mounted in spaced relation to define a gap, through which a magnetic field flows in a direction substantially parallel to said rotary axis, the permanent magnets of each group being distributed circumferentially about said rotary axis and being polarized along an axis extending substantially parallel to said rotary axis, each adjacent pair of permanent magnets in each group being of opposite polarity, the poles of the permanent magnets of said first group being of opposite polarity to the facing poles of the permanent magnets of said second group, half of the permanent magnets of each group extend radially beyond the other permanent magnets of said group, said first-mentioned half of said permanent magnets of respective groups being in facing relation and arranged alternately within the group with the permanent magnets of lesser radial dimension, said magnetic sensitive element means including magneto resistive element means positioned within the locus of said permanent magnets of greater radial dimensions but outside of the locus of said permanent magnets of lesser radial dimension, a flat stator plate positioned within said gap and having driving coil means and magneto resistive element means mounted thereon in said gap to thereby be within said magnetic field, said magnetic sensitive element being adapted to detect the condition of said magnetic field when said rotor is still and moving to produce a detecting signal in response thereto; and circuit means interconnecting said driving means and magnetic sensitive element means for applying a driving current to said driving coil means in response to said detecting signal.

12. A brushless direct current motor as recited in claim 11, including at least two magnetic reluctance elements and at least two driving coils, said circuit means interconnecting each of said driving coils with one of said magnetic reluctance elements for the control thereof.

* * * * *

UNITED STATES PATENT OFFICE
CERTIFICATE OF CORRECTION

PATENT NO. : 3,867,656
DATED : February 18, 1975
INVENTOR(S) : Yoshihiro Mitsui and Hiroshi Kamakura It is certified that error appears in the above-identified patent and that said Letters Patent are hereby corrected as shown below:

Cover page, item 73, cancel "Assignees: Kabushiki Kaisha Siwa Seikosha, Ginza; Kabushiki Kaisha Siwa Seikosha, Chuo-ku, both of, Japan" and substitute --Assignee: Kabushiki Kaisha Suwa Seikosha, Ginza, Chuo-ku, Japan --.

Signed and Sealed this ninth Day of December 1975

[SEAL]

Attest:

RUTH C. MASON
*Attesting Officer*

C. MARSHALL DANN
*Commissioner of Patents and Trademarks*